United States Patent [19]

Goings

[11] 4,124,221
[45] Nov. 7, 1978

[54] SPRAY GUARD FOR VEHICLES

[76] Inventor: Harford E. Goings, 9329 Battle St., Manassas, Va. 22110

[21] Appl. No.: 760,982

[22] Filed: Jan. 21, 1977

[51] Int. Cl.² .............................................. B62B 39/00
[52] U.S. Cl. ........................................... 280/154.5 R
[58] Field of Search .................... 280/154.5 R, 152 R, 280/153 R; 298/1 SG; 160/133, 264, 322; 296/98

[56] References Cited

U.S. PATENT DOCUMENTS

| 740,033 | 9/1903 | McNamara | 160/322 |
| 1,936,300 | 11/1933 | Guss | 160/133 |
| 2,240,416 | 4/1941 | Pidgeon | 160/264 X |
| 2,780,283 | 2/1957 | Wasserman | 160/264 X |
| 3,430,677 | 3/1969 | Pierce | 160/264 |
| 3,860,262 | 1/1975 | Goings | 280/154.5 R |
| 3,866,943 | 2/1975 | Innis | 280/154.5 R |

FOREIGN PATENT DOCUMENTS 759,780  2/1934  France ............................... 280/152 R

*Primary Examiner*—Evon C. Blunk
*Assistant Examiner*—Michael J. Forman
*Attorney, Agent, or Firm*—Blair, Brown & Kreten

[57] ABSTRACT

A movable spray guard to be lowered alongside the ground engaging wheels of a vehicle including a flexible screen mounted in a track and moved by a motor driven chain from an operative position to an inoperative retracted position.

2 Claims, 10 Drawing Figures

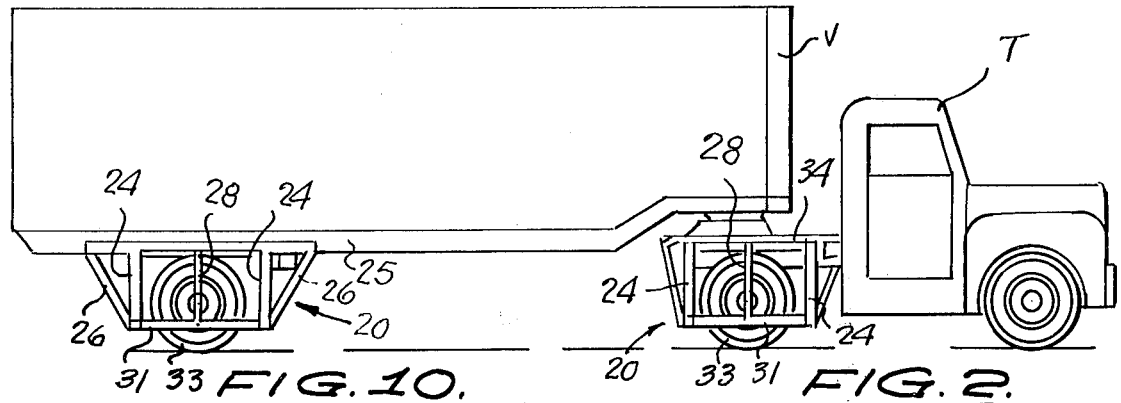
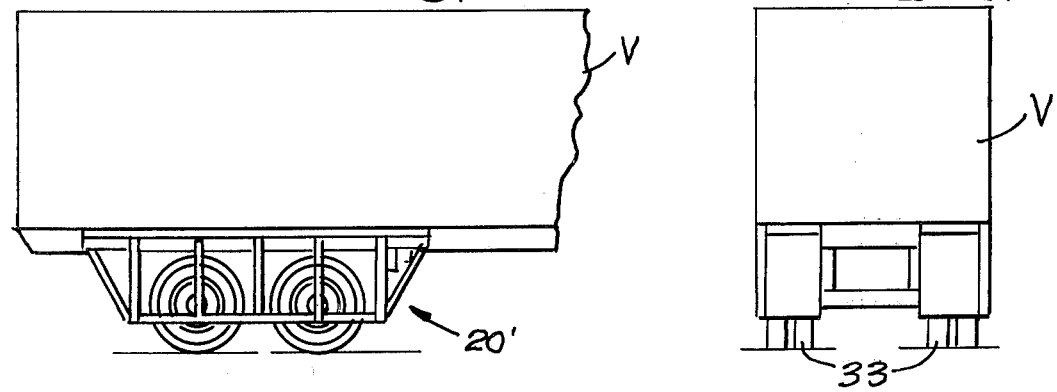
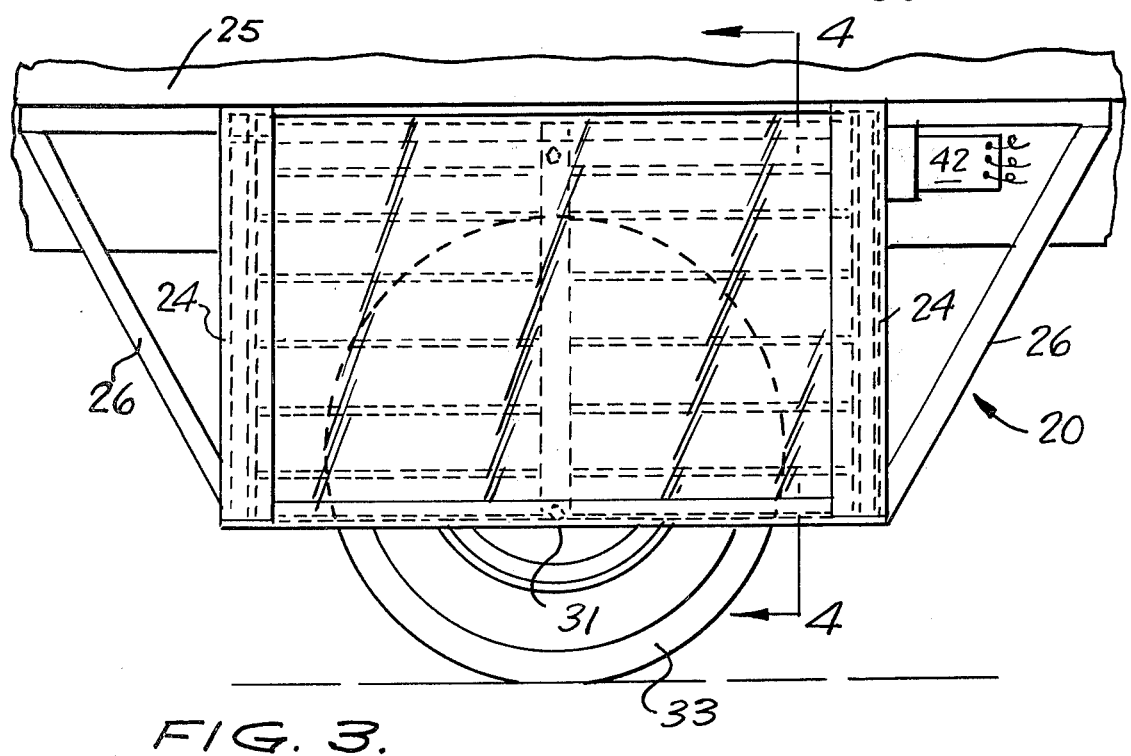

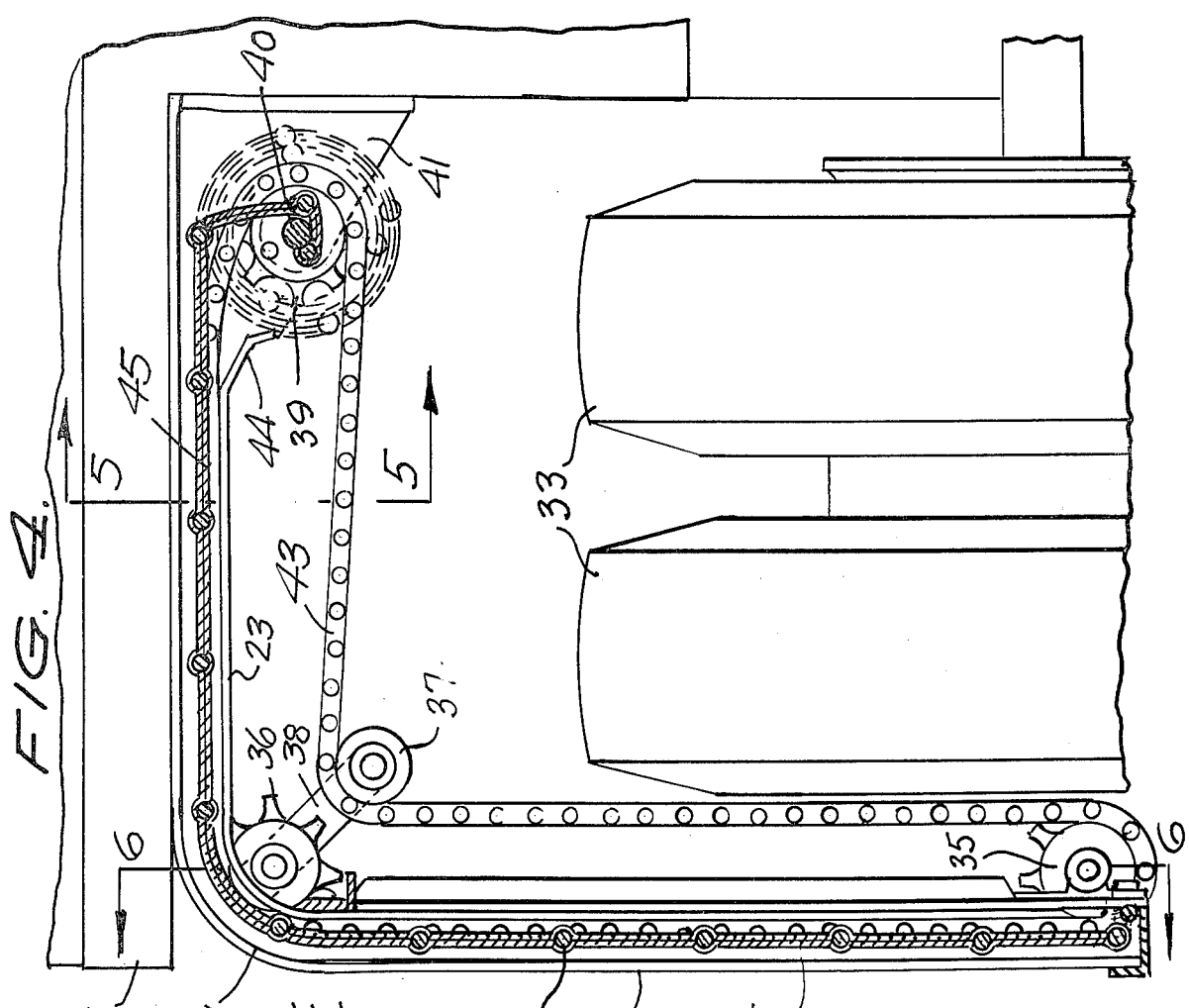
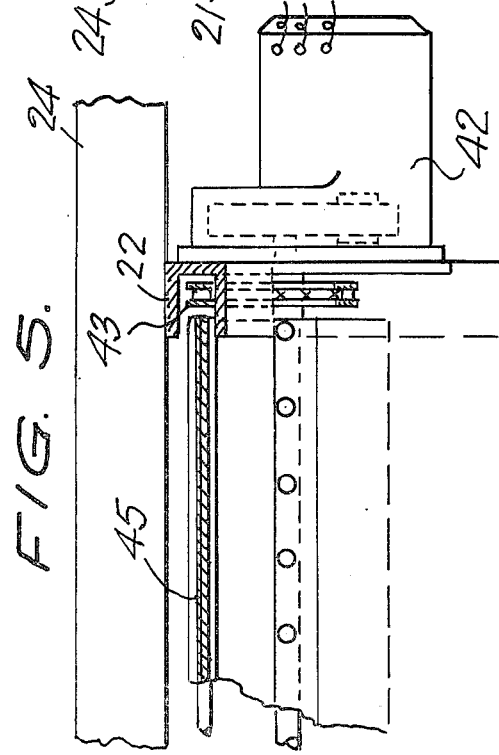
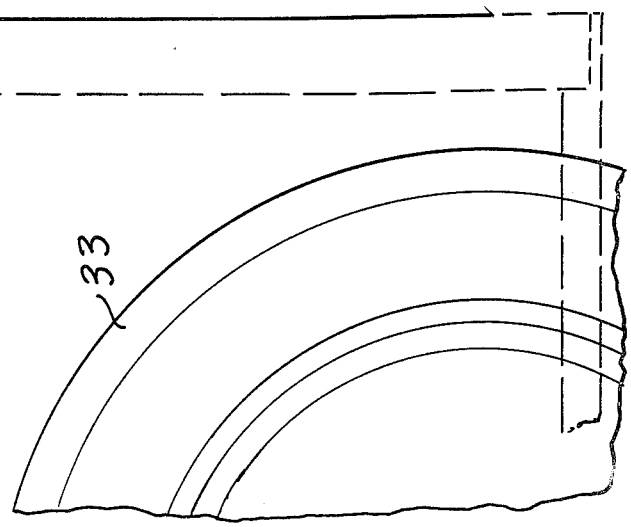

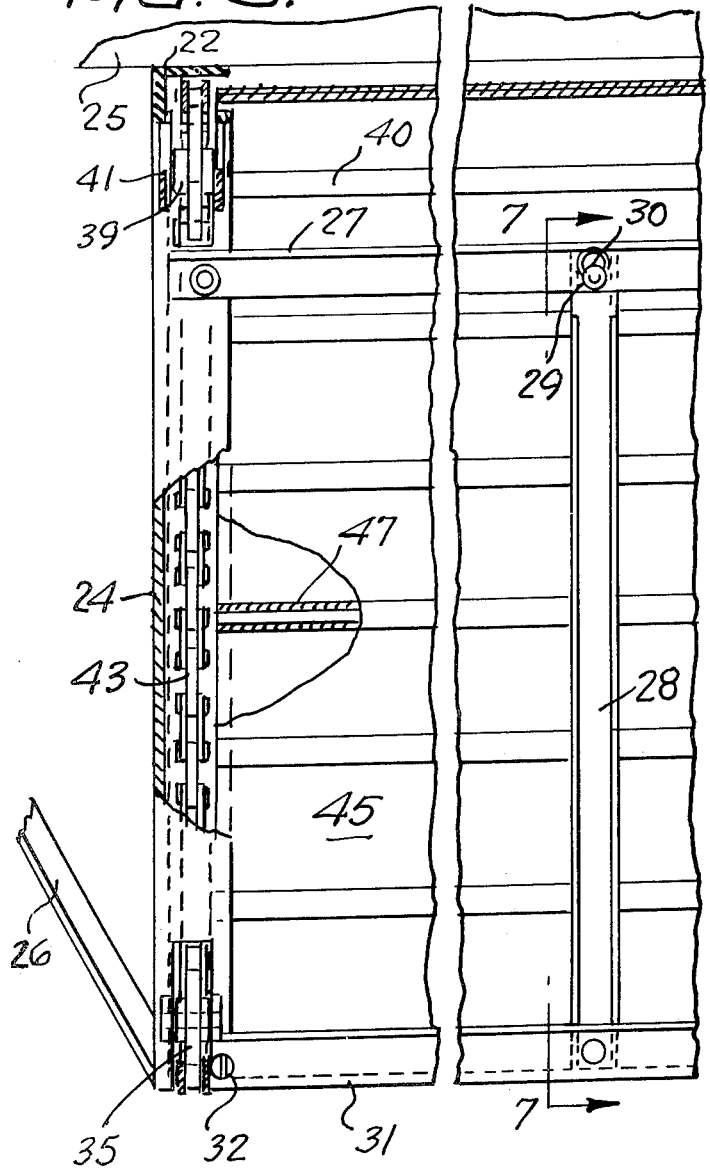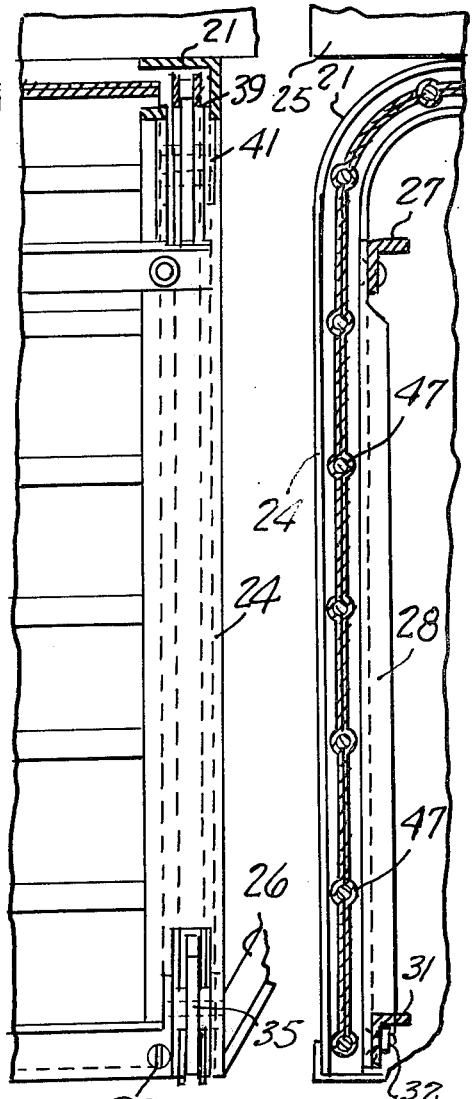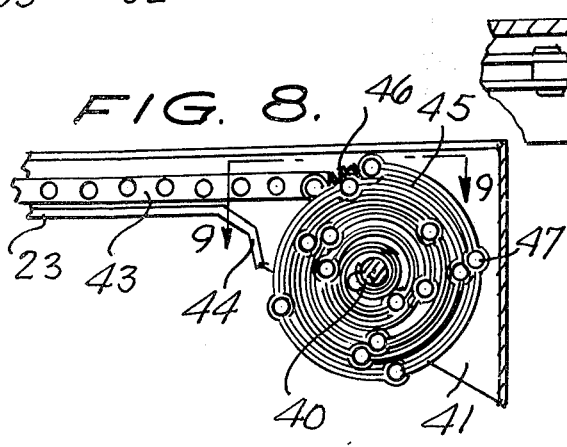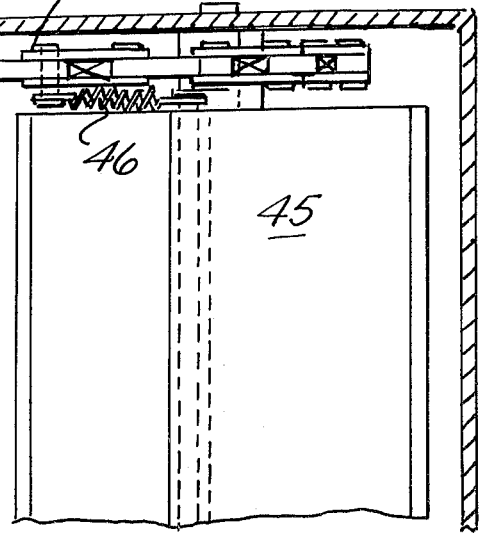

SPRAY GUARD FOR VEHICLES

BACKGROUND OF THE INVENTION

FIELD OF THE INVENTION

The present invention relates to spray guards for the wheels of vehicles to prevent side spray.

Experience shows that heavy trucks on a wet highway cause great clouds of water spray mixed with road debris to be thrown far to each side of the truck. This condition renders driving on wet highways dangerous not only for smaller vehicles but also for other trucks as the dirt will be deposited on the windshields of any vehicles close to the truck raising the cloud of spray, and the view past such a truck is of course obscured.

The primary object of the invention is to provide a movable spray guard for the ground engaging wheels of a truck or trailer.

Other objects and advantages will become apparent in the following specification when considered in light of the attached drawings.

BRIEF DESCRIPTION OF THE DRAWINGS

FIG. 1 is a side elevation of the invention shown attached to a tractor-trailer vehicle with the guards in retracted position;

FIG. 2 is a rear elevation of the vehicle illustrated in FIG. 1;

FIG. 3 is an enlarged side elevation of the structure illustrated in FIG. 1 with the guard in lowered position;

FIG. 4 is an enlarged fragmentary sectional view taken along the line 4—4 of FIG. 3 looking in the direction of the arrows;

FIG. 5 is a fragmentary sectional view taken on the line 5—5 of FIG. 4 looking in the direction of the arrows;

FIG. 6 is a fragmentary sectional view taken on the line 6—6 of FIG. 4 looking in the direction of the arrows;

FIG. 7 is a vertical sectional view taken along the line 7—7 of FIG. 6 looking in the direction of the arrows;

FIG. 8 is a fragmentary sectional view similar to FIG. 4 with the guard in retracted position;

FIG. 9 is a fragmentary horizontal sectional view taken along the line 9—9 of FIG. 8 looking in the direction of the arrows; and FIG. 10 is a side elevation of a modified form of the invention shown applied to a tandem axle vehicle.

DESCRIPTION OF THE PREFERRED EMBODIMENTS

Referring now to the drawings in detail wherein like reference characters indicate like parts throughout the several Figures the reference numeral 20 indicates generally a spray guard for motor vehicles constructed in accordance with the invention.

The spray guard 20 includes a pair of facing channel tracks 21, 22 each having a generally horizontal leg 23 and a generally vertical leg 24 connected by an integral intermediate arcuate portion. The horizontal portion 23 of the tracks 21, 22 are secured to the base 25 of a tractor-trailer with the vertical portion 24 generally aligned with the outer edge of the base 25. Bases 26 extend from the base 25 to the lower ends of the channel tracks 24 to assist in supporting the upright portions 24 of the channel tracks 21, 22. An angle iron cross brace 27 connects the channel tracks 21, 22 adjacent the upper end of the vertical portions 24 as can be best seen in FIGS. 6 and 7.

A vertical brace 28 is connected to the center of the brace 27 by a headed pin 29 engaged through a bayonet slot 30 in the brace 27. A horizontal brace 31 is secured to the lower end of the vertical brace 28 and is detachably connected to the lower ends of the vertical portions 24 by means of bolts 32. The braces 28, 31 may be readily removed for changing the tires 33 of the vehicle V to which the spray guard 20 is attached.

The spray guard 20 attached to the tractor vehicle T illustrated in FIG. 1 is secured to a horizontal plate 34 which is mounted on the tractor T to extend over the wheels 33 to support the spray guard 20.

An idler sprocket 35 is journalled on the lower end of each of the upright portions 24 of the channel tracks 21, 22 for reasons to be assigned. A second idler sprocket 36 is journalled to the channel tracks 21, 22 adjacent the upper end of the upright portions 24 thereof for reasons to be assigned. An idler support roller 37 is journalled on a bracket 38 extending from the channel tracks 21, 22 spaced inwardly and downwardly from the sprocket 36. A pair of sprockets 39 are mounted on a shaft 40 which is journalled in webs 41 on the inner ends of the horizontal portions 23 of the channel tracks 21, 22. An electric drive motor 42 is mounted on the inner end of the horizontal portion 23 of the channel track 22 with the shaft 40 being driven thereby.

A sprocket chain 43 is trained over the sprockets 35, 36 and 39 and is supported by the idler roller 37 with the sprocket chain extending through the channel track 21, 22 on each side of the spray guard 20. The inner ends of the horizontal portions 23 of the channel tracks 21, 22 are downwardly flared at 44 to guide the chain 43 as it enters and leaves the channel track 21, 22.

A flexible panel 45 is secured at one end to the shaft 40 and its opposite end to the chain 43 by means of tension springs 46 as can be best seen in FIGS. 8 and 9. The flexible panel 45 is laminated and has a plurality of horizontally extending stiffening rods 47 extending therethrough in vertically spaced relation as can be best seen in FIG. 4. The flexible panel 45 has its opposite ends engaged in the channel tracks 21, 22 and is supported and guided thereby.

In the use and operation of the invention the electric motor 42 is energized by means of a dashboard mounted electric switch (not shown) rotating the shaft 40 with its sprockets 39. The sprockets 39 move the chain 43 and draw the flexible panel 45 outwardly as guided by the channel tracks 21, 22. The flexible panels 45 move to a position outside of the wheels 33 to prevent spray from moving outwardly therefrom. When the pavements are dry the panels 45 are retracted onto the shafts 40 with the tension springs 46 allowing for the size change in the panel 45 as it rolls on the shaft 40.

In FIG. 10 a modified form of the invention is illustrated wherein the spray guard 20' is elongated to provide for tandem axle construction as is found on some vehicles.

Having thus described the preferred embodiments of the invention it should be understood that numerous structural modifications and adaptations may be resorted to without departing from the spirit of the invention.

What is claimed is:

1. A spray guard for vehicles and the like comprising a pair of tracks each having a generally horizontal leg and vertical leg interconnected by an arcuate portion wherein said horizontal leg is secured to the base of said vehicle while the vertical leg is substantially aligned with the outer extent of said base, angle support bars connected and extending from the terminal portion of said vertical legs remote from said base connected to said base to provide additional support, and upper and lower horizontal support braces interconnecting said vertical legs for rigidification, said upper and lower horizontal support braces themselves detachably interconnected substantially along their midpoint so as to provide a supporting frame network for said panel to withstand any debris ejected from the tire to said panel, said tracks secured to the vehicle and positioned one in front of and one behind a wheel of the vehicle and extending downwardly outwardly of the wheel, an endless chain extending through each of said tracks, a flexible panel defined by a plurality of small panel elements interconnected in series by rod members which tend to rigidify said panel elements from deflection and deformation in a direction transverse to said rods and further defined in that the diameter of said rods are substantially less than the width of said small panel elements and said flexible panel is mounted for sliding movement in said track means on said tracks for driving said endless chain, and means securing said panel to said chain whereby upon movement of said chain said panel will be moved downwardly to a position opposite said wheels.

2. A device as claimed in claim 1 in which said means for securing said panel includes a shaft supporting one end of said panel with said panel being rolled on said shaft in retracted position and spring means supporting the panel remote from said shaft supporting end to provide tension, play and displacement at the spring supporting end to allow for the increasing diameter of the shaft when said panel is winding thereon.

* * * * *